Figure 1:
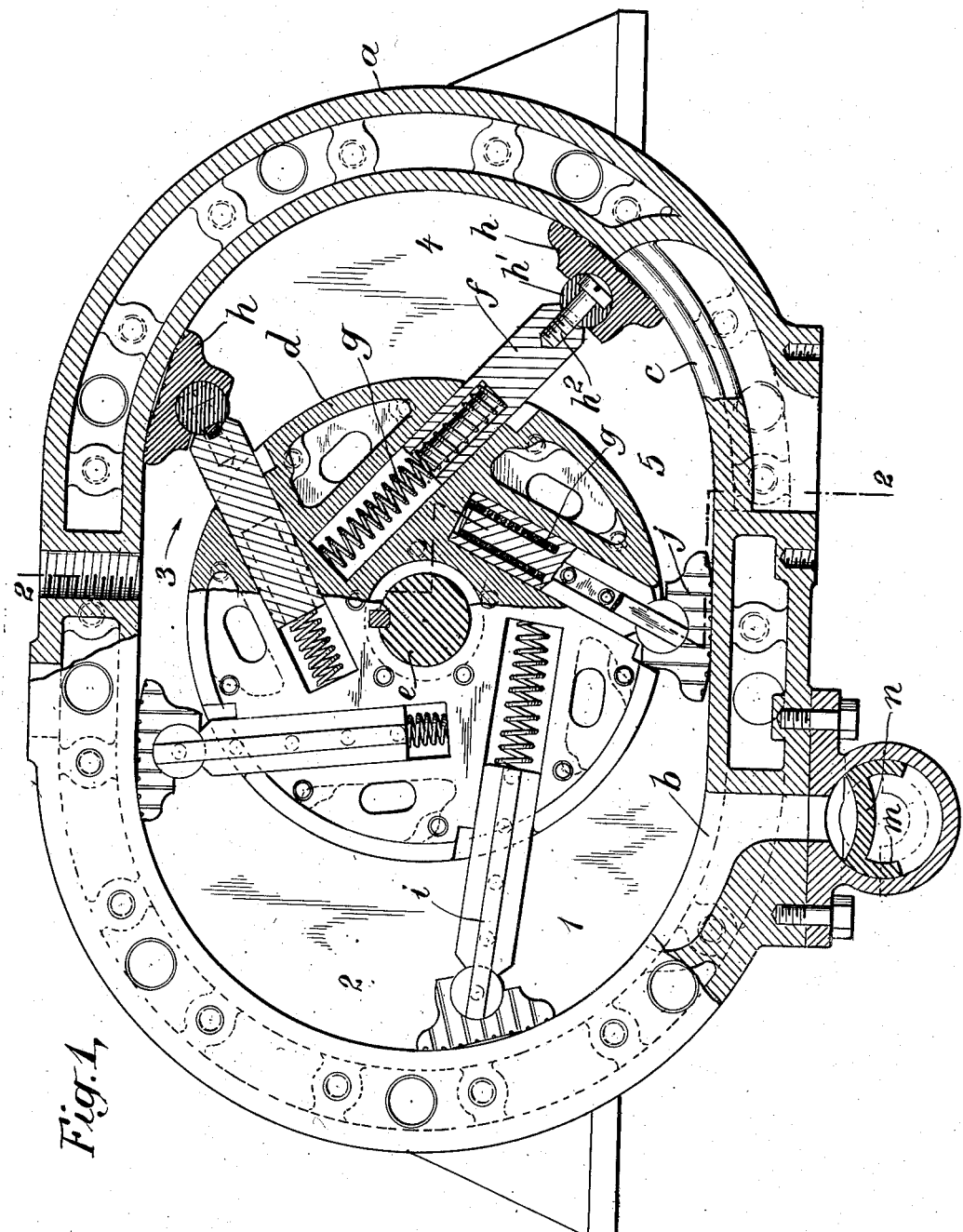

E. H. EWERTZ.
ROTARY INTERNAL COMBUSTION ENGINE.
APPLICATION FILED FEB. 12, 1910.

980,506.

Patented Jan. 3, 1911.
2 SHEETS—SHEET 1.

WITNESSES:

INVENTOR

BY

ATTORNEYS

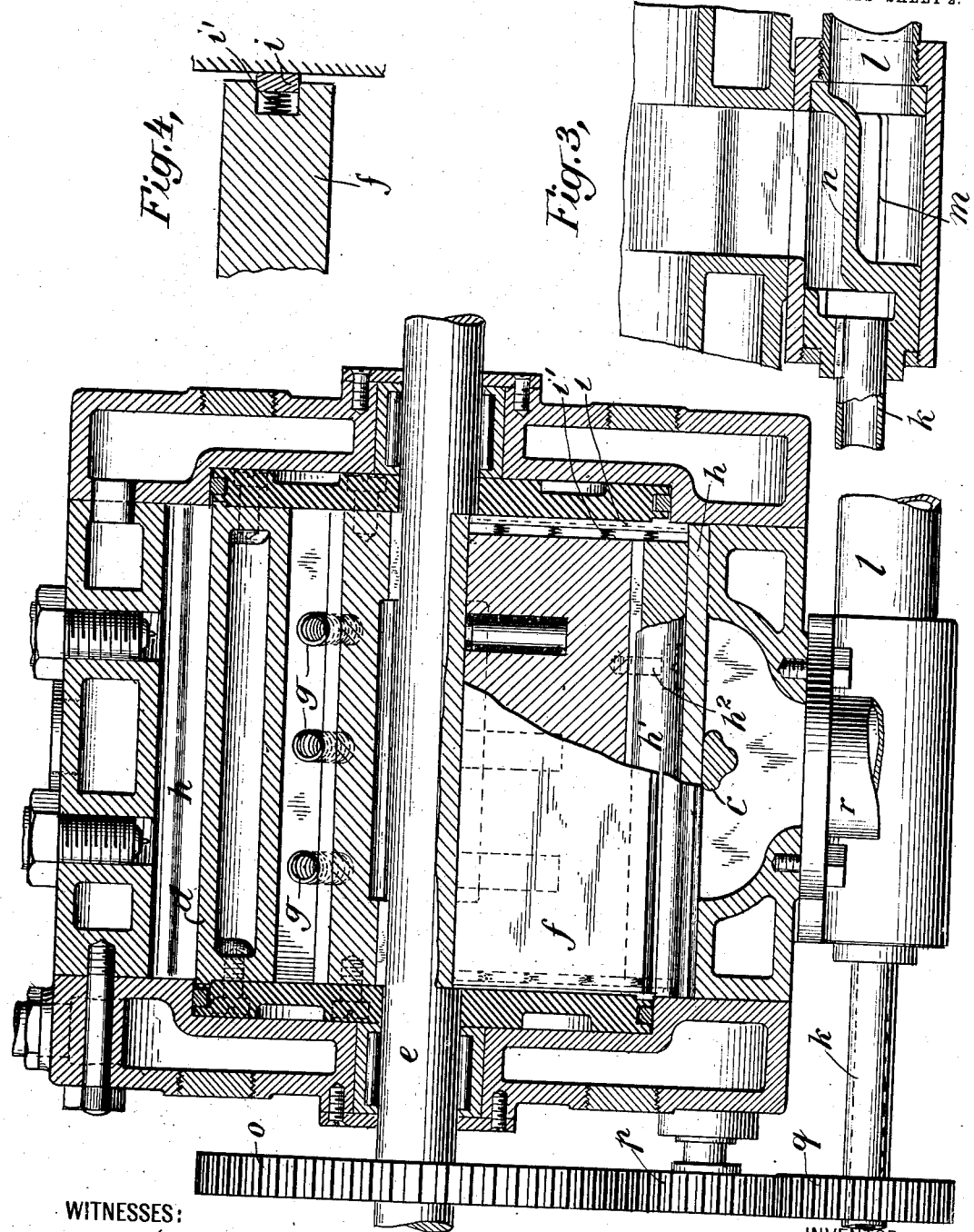

UNITED STATES PATENT OFFICE.

ERIC HARALD EWERTZ, OF WOLLASTON, MASSACHUSETTS.

ROTARY INTERNAL-COMBUSTION ENGINE.

980,506.  Specification of Letters Patent.  Patented Jan. 3, 1911.

Application filed February 12, 1910. Serial No. 543,515.

*To all whom it may concern:*

Be it known that I, ERIC H. EWERTZ, a citizen of the United States, residing in the city of Wollaston, county of Norfolk, and Commonwealth of Massachusetts, have invented certain new and useful Improvements in Rotary Internal-Combustion Engines; and I do hereby declare the following to be a full, clear, and exact description of the invention, such as will enable others skilled in the art to which it appertains to make and use the same.

The object of my invention is to provide an improved rotary internal combustion engine having a combustion chamber into which the combustible mixture is admitted, and in which it is compressed, ignited and permitted to expand to develop the propelling force, and from which the expanded products of combustion are exhausted, during the rotation of the rotary element. To this end, I provide an outer member or casing inclosing a combustion chamber and within which is an inner member, the outer and inner member being capable of rotary movement with respect to one another, and being of such relative shape or configuration that the combustion chamber inclosed between them has a different volume at different parts, that is, has a different cross-sectional area on different radial planes parallel to the axis of the engine. Between the two members, and dividing the combustion chamber into compartments, are arranged a series of partitions of such character as to be capable of varying in length to correspond to the varying distance between the inner and outer members, whereby the volume of each compartment is correspondingly varied during rotation. I further provide connections for supplying a combustible mixture to the said compartments at a point or period of rotation where they are of large volume; and ignition mechanism for igniting the mixture at or near the point or period of rotation where the compartments are of minimum volume and the combustible mixture is at maximum compression. In this way the combustible mixture is compressed by the relative rotation of the parts, and the consequent reduction in volume of the compartments, and is ignited near the point of maximum compression, the arrangement being such that as the mixture burns and the gases expand they act upon the leading partition to develop the propelling force, and after the gases have thus expanded they are exhausted through a suitable exhaust port.

Furthermore in accordance with my invention provision is made for thoroughly flushing the combustion compartments, and reducing the temperature within the engine. To this end, the arrangement is such that when combustion has taken place within a compartment during one rotation, then during the next rotation there is supplied to it a quantity of air or other cooling non-combustible gas. This is effected, in the preferred arrangement, by dividing the combustion chamber into an odd number of compartments, and providing separate conduits for leading to the inlet port a combustible mixture and air or other cooling non-combustible gas, together with a valve or valves controlling said conduits and actuated at regular intervals, so that as the compartments rotate they are automatically filled on one revolution with the combustible mixture and on the next revolution with the air or other cooling gas.

In the drawings Figure 1 is a central section partly in elevation of the casing containing the rotating member and the movable partitions. Fig. 2 is a section on the line 2—2 of Fig. 1, partly in elevation to amplify the illustration. Fig. 3 is a detailed section through the rotatable valve for supplying alternately a combustible mixture and air or other cooling gas to the combustion compartments, and Fig. 4 is a detailed section showing the packing arrangement for the side of each movable partition.

The casing $a$ of my improved engine is approximately elliptical in cross-section as shown and is provided with a water jacket of ordinary construction to reduce the temperature. It has an inlet port at $b$, controlled by the rotating valve above mentioned and which will be further described hereinafter; and an outlet or exhaust port at $c$. Within this chamber is a rotating drum $d$ concentrically mounted on the shaft $e$ of the engine, and this drum carries a series of movable or extensible partitions $f$. The structure of the partitions can readily be seen from Fig. 1 where it will be observed that each one comprises a body portion recessed at its inner end to receive a spring $g$, and carrying at its outer end a shoe $h$ rocking on a cylindrical bearing member $h'$ which is fastened to the end of the partition $f$ by a countersunk screw $h^2$. To prevent leakage past the side faces of the partitions $f$ I set into those faces packing strips $i$ pressed outward against the wall of the combustion chamber by springs $i'$ and extending the entire length of the partition and across the end of the cylindrical bearing member $h'$. In the faces of the shoes $h$ are small grooves $j$ which, when filled with oil, are sufficient to prevent leakage past the shoes. It will be observed that the curvature of the shoes is compound, the end portions corresponding in curvature to the end walls of the casing, and the central portions of the shoe faces corresponding to the flattened portions of the casing between the curved end portions. As a matter of convenience in manufacture I prefer to form the casing of two semi-circumferences united by an intermediate straight portion instead of making it exactly elliptical. The partitions $f$, instead of being mounted radially on the rotary member $d$, are tangential to a circle lying in the body of the rotary member and concentric with it. When a plurality of partitions are mounted in this way on the rotary member it results that at the point of maximum compression the partition which forms the leading wall of the compartment presents a greater area than the partition which forms the lagging wall of the compartment. This is clearly shown in Fig. 1 and it results in increasing the rotary effect of the expanding gases.

The combustible mixture and the cooling air or other inert gas, are admitted to the combustion compartments through the port $b$ by means of the rotating valve $m$ which is divided by the partition $n$ (see Fig. 3). The air, or other cooling gas, is admitted to one side of the partition $m$ in the rotary valve by conduit $k$, and the combustible mixture is admitted to the other side of the valve by conduit $l$. Either of these conduits may also conveniently constitute the driving axle for rotating the valve, and in the drawing I have illustrated the conduit $k$ as performing that function. To this end there is mounted on conduit $k$ a pinion $q$ meshing with an idler pinion $p$ which in turn meshes with a driving pinion $o$ on the shaft of the motor. The speed ratios of the pinions are such that the rotary valve feeds alternately the combustible mixture and the cooling air or gas into the combustion compartments. That is to say, following a cycle of the engine, when a compartment is in position 1 of Fig. 1 it is taking in a supply of the combustible mixture. It then moves on to position 2 where compression begins and at position 3 the area is reduced to the minimum and the compression is at the maximum, and at this point ignition takes place. Moving from position 3 to 4 the gases are expanding and developing their propelling force and from position 4 to 5 the products of combustion are exhausted. There are an odd number of compartments so that when the compartment we have been considering arrives again at position 1, it will receive a supply of the air or other cooling gas and will continue through the second rotation with this inert charge, so that in a particular compartment there is one explosion for every two complete rotations. In this way the temperature is reduced and the entire operation of the engine is dependent upon but a single valve of the rotary type and of great simplicity.

What I claim is:—

1. A rotary internal combustion engine, having a casing inclosing a combustion chamber, within which is mounted a partition-carrying member, the casing and the partition-carrying member being capable of relative rotation and being so shaped that the space between them is of different cross-sectional area at different parts, on radial planes parallel to the axis of the engine, partitions dividing said space and capable of varying in length to maintain the division of said space into separate compartments throughout the rotation, whereby the compartments vary in volume during the rotation, mechanism for supplying to each compartment at a position of relatively large volume a combustible mixture during one revolution and a charge of cooling gas during the next succeeding revolution, mechanism for firing the combustible mixture near the point of minimum volume and maximum compression, and an exhaust port in position to discharge the expanded products of combustion, substantially as described.

2. A rotary internal combustion engine having a casing inclosing a combustion chamber, within which is mounted a partition-carrying member, the casing and the partition-carrying member being capable of relative rotation and being so shaped that the space between them is of different cross-sectional area at different parts on radial planes parallel to the axis of the engine, an odd number of partitions dividing said space and capable of varying in length to maintain the division of said space into separate compartments throughout the rotation, whereby the compartments vary in volume during the rotation, an inlet port through the wall of said casing, a conduit for leading a combustible mixture to said port, a second conduit for leading air or other cooling gas to said port, valve mechanism controlling said conduits and arranged to connect them alternately to said port at periodic intervals, the said inlet port being located at a position where the compartments are of relatively large volume, whereby there is supplied to each compartment a combustible mixture during one revolution and a charge of cooling gas during the next succeeding revolution, mechanism for firing the combustible mixture near the point of minimum volume and maximum compression and an exhaust port in position to discharge the expanded products of combustion, substantially as described.

3. A rotary internal combustion engine having a casing inclosing a combustion chamber, within which is concentrically mounted a partition-carrying member, the casing and the partition-carrying member being capable of relative rotation, and being so shaped that the space between them is of different cross-sectional area at different parts on radial planes parallel to the axis of the engine, partitions dividing said space and capable of varying in length to maintain the division of said space into separate compartments throughout the rotation, said partitions being mounted in the rotary member tangentially to a circle lying within and concentric with it, and mechanism for admitting a combustible charge to the compartments so formed, mechanism for igniting the charge therein, and an exhaust outlet for the expanded products of combustion, substantially as described.

4. A rotary internal combustion engine having a casing inclosing a combustion chamber, within which is mounted a partition-carrying member, the casing and the partition-carrying member being capable of relative rotation and being so shaped that the space between them is of different cross-sectional area at different parts on radial planes parallel to the axis of the engine, an odd number of partitions dividing said space and capable of varying in length to maintain the division of said space into separate compartments throughout the rotation, whereby the compartments vary in volume during the rotation, an inlet port through the wall of said casing, a conduit for leading a combustible mixture to said port, a second conduit for leading air or other cooling gas to said port, a rotary valve controlling said conduits, and driving connections from the shaft of the engine to said valve, of such speed ratio as to feed the combustible mixture to one compartment and the cooling air or gas to the next compartment, the said inlet port being located at a position where the compartments are of relatively large volume, whereby there is supplied to each compartment a combustible mixture during one revolution and a charge of cooling gas during the next succeeding revolution, mechanism for firing the combustible mixture near the point of minimum volume and maximum compression, and an exhaust port in position to discharge the expanded products of combustion, substantially as described.

In testimony whereof I affix my signature, in presence of two witnesses.

ERIC HARALD EWERTZ.

Witnesses:
FRANK L. BRAKE,
W. D. FESLER.